2 Sheets—Sheet 1.

J. WOLF.
Churn.

No. 222,431. Patented Dec. 9, 1879.

Witnesses:
John A. Hughs
O. J. Bailey

Inventor:
Jacob Wolf
By J. S. Berber
Atty.

2 Sheets—Sheet 2.
J. WOLF.
Churn.
No. 222,431. Patented Dec. 9, 1879.
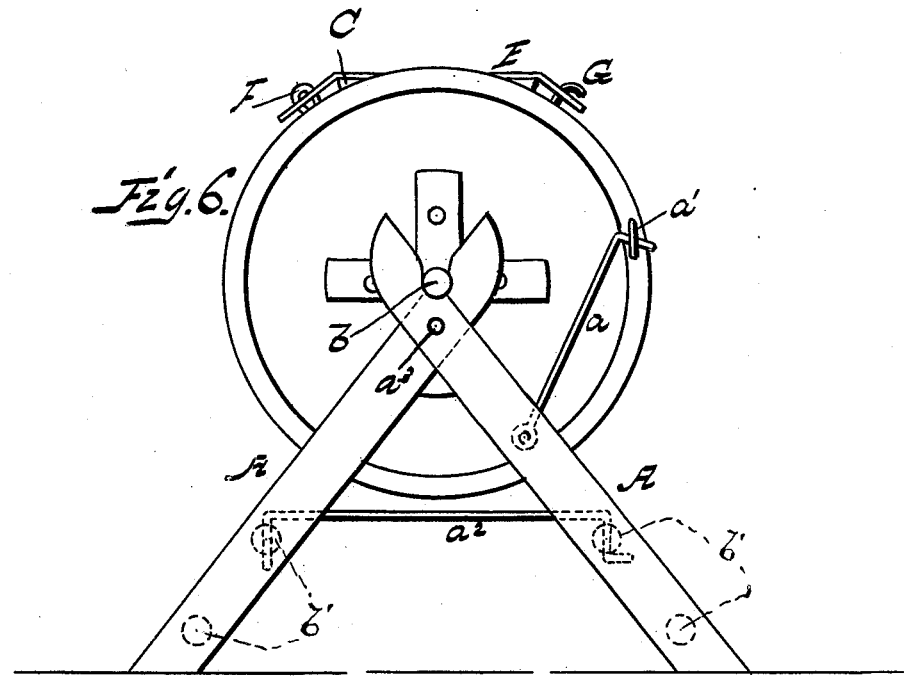
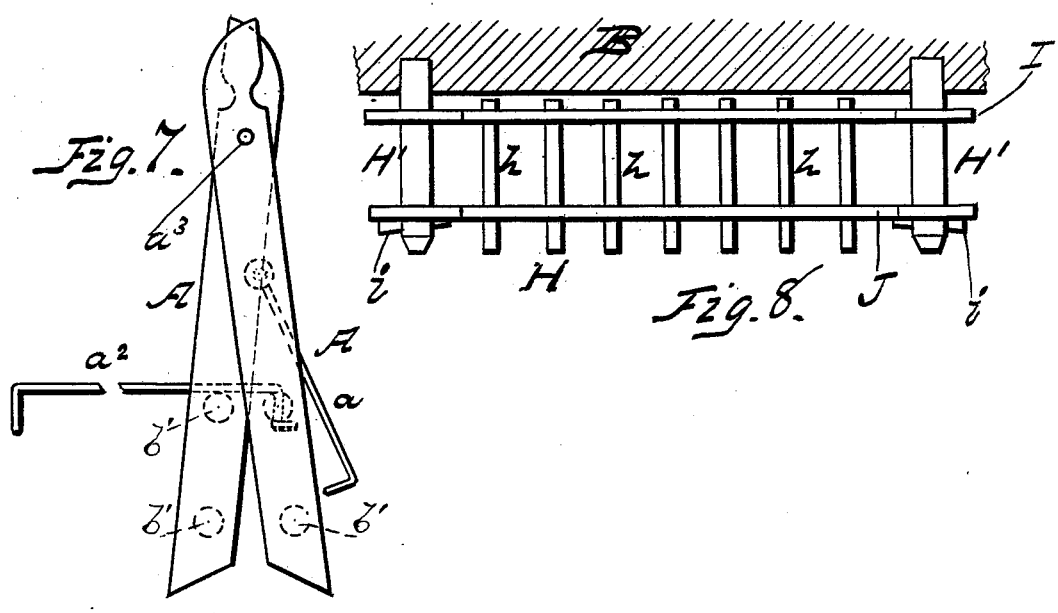
WITNESSES
E. H. Bates
H. L. Ramey
INVENTOR
Jacob Wolf.
Wm. H. Bates & Co.
ATTORNEYS.

UNITED STATES PATENT OFFICE.

JACOB WOLF, OF HENDERSON, MINNESOTA.

IMPROVEMENT IN CHURNS.

Specification forming part of Letters Patent No. 222,431, dated December 9, 1879; application filed September 27, 1878.

*To all whom it may concern:*

Be it known that I, JACOB WOLF, of Henderson, State of Minnesota, have invented a new and useful Improvement in Rotary Churns, which improvement is fully set forth in the following specification and accompanying drawings, in which—

Figure 1:
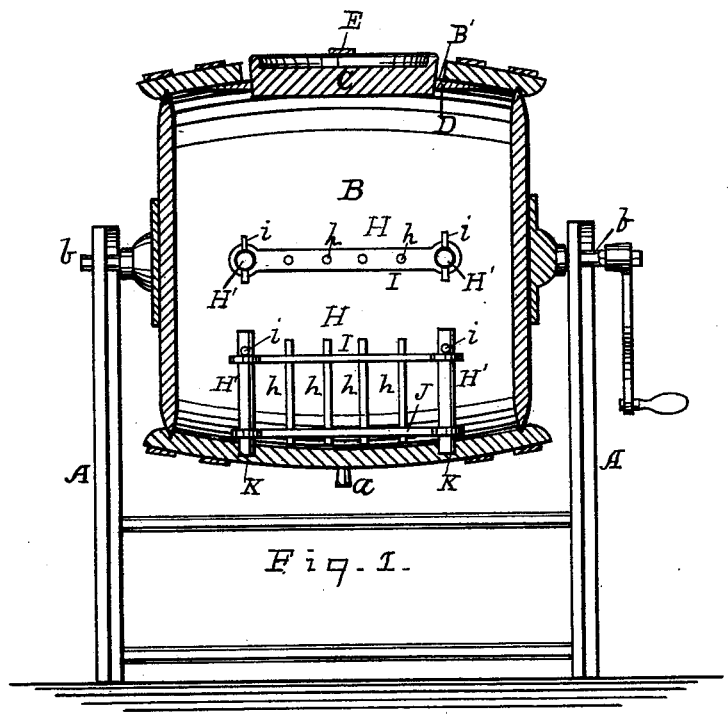
Figure 2:
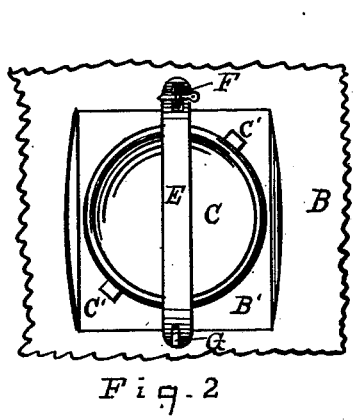
Figure 4:
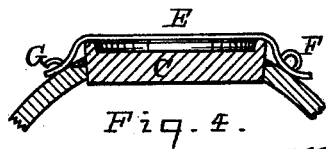
Figure 3:
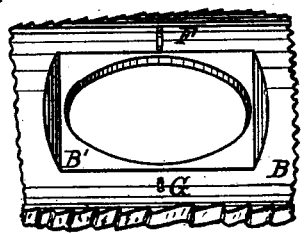
Figure 5:
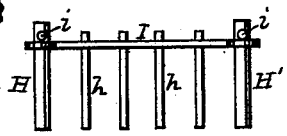

Figure 1 represents a vertical longitudinal sectional view of my improved churn. Fig. 2 is a top view. Fig. 3 represents a view of the opening in the churn. Fig. 4 is a cross-sectional view of the lid of the churn. Fig. 5 is a detail view of one of the dashers. Fig. 6 is an end view. Fig. 7 is a view of the stand (on which the churn is supported) closed; and Fig. 8 represents a part sectional view of the churn, showing one of the dashers fixed thereto.

My invention relates to improvements in that class of devices known as "rotary churns," the dashers of which are so constructed that they will effectually beat the cream and readily gather the butter. Said dashers can easily be removed when desired, as will be hereinafter more fully described.

A represents a folding stand, pivoted at its upper end, on which the churn is supported, and is provided at its upper end with bearings, in which gudgeons $b$, applied to each side of the churn, rest and revolve. The same is further provided with rounds $b'$, extending from side to side, and having rods $a^2$, one end of which is fixed to one of the rounds, and the other end thereof has a hook that is passed through a perforation in the opposite round.

B represents the barrel of which my churn is composed, having on each side thereof gudgeons $b$. The longest one is provided with a handle, by which the churn is revolved. Said barrel is provided with an opening, through which the cream is poured into the barrel, and through which the butter is taken out after churning. The opening is provided with a lid, C, the edge of which is beveled to more readily accommodate itself to said opening, and forming a tight joint between the edge of said lid and the inner surface of the opening in the barrel. On one side of the opening is placed a hook, G, and on the other side a staple, F, to receive a strap, E, that passes over the top of the lid C, to keep the latter securely fixed to the churn B. On one end of the barrel B is a staple, $a'$, to receive a rod, $a$, one end of which is pivoted to one side of the frame A, and the opposite end thereof has a hook that enters the staple $a'$, to keep the barrel B from revolving when the latter is not in use.

H represents the dashers composed of two posts, H' H', the inner ends of which are driven into the barrel on the inner surface thereof, and having suitable cross-pieces I and J, provided with eyes at each end to receive the posts H' H', after which a key, $i$, is inserted in a perforation in the outer end of said posts, and on the outside of the pieces aforesaid, to prevent the dashers from being displaced. A number of perforations are made in the pieces I and J, through which are driven rounds $h$, thus completing the dasher.

It will thus be seen that when the barrel B is revolved by the operator the cream is agitated by coming in contact with the dashers H, thereby producing butter, and at the same time the lid C, having a tight joint, prevents any waste of cream.

It will also be observed that when the barrel B is to be mounted on the stand A, the latter is opened, as shown in Fig. 6 of the drawings, and the hook ends of the rods $a^2$ are inserted into the perforations in the round $b'$, thereby keeping the stand A stationary. The rod $a$ applied to the stand A serves to keep the barrel steady, when the latter is not in use, by the hook end thereof passing through the staple $a'$. Also, the stand A can be folded by removing the hook ends of the rods $a^2$ from engagement with the perforations in the round $b'$, and said stand turning on its pivot at $a^3$, thereby allowing the same to be folded and put away without occupying a very large space, as shown in Fig. 7 of the drawings.

Furthermore, it will be seen that I construct a dasher in the form of a rack, and having the parts I, J, and $h$ removably applied to the posts H' H', for the purpose of more readily allowing the same to be cleansed. In detaching the aforesaid dasher it will be necessary to remove the pins $i$ from the posts H' H', and the dasher can be easily slipped off of said posts. I also may dispense with the cross-piece nearest to the barrel, and drive the inner ends of the rounds *h* into holes made in said barrel for that purpose.

These dasher-blades can be taken out, if desired, and longer or shorter ones substituted when necessary.

Having thus described my invention, what I claim as new, and desire to secure by Letters Patent, is—

In a rotary-body churn, B, the removable dasher, consisting of the parts H H', I, *i i*, and *h h*, constructed and applied as shown and described, whereby all the parts thereof are capable of being taken apart to be cleaned and replaced or interchanged, substantially as and for the purpose set forth.

In testimony that I claim the foregoing I have hereunto set my hand this 2d day of September, A. D. 1878.

JACOB WOLF.

Witnesses:
 J. S. ZERBE,
 O. J. BAILEY.